(12) United States Patent
Jiang et al.

(10) Patent No.: US 11,202,310 B2
(45) Date of Patent: *Dec. 14, 2021

(54) METHODS AND APPARATUS FOR ADAPTIVE CHANNEL ACCESS

(71) Applicant: NXP USA, INC., Austin, TX (US)

(72) Inventors: Jinjing Jiang, San Jose, CA (US); Liwen Chu, San Ramon, CA (US); Lei Wang, San Diego, CA (US); Yakun Sun, San Jose, CA (US); Hongyuan Zhang, Fremont, CA (US); Huiling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,351

(22) Filed: Feb. 17, 2020

(65) Prior Publication Data

US 2020/0214033 A1 Jul. 2, 2020

Related U.S. Application Data

(63) Continuation of application No. 15/423,371, filed on Feb. 2, 2017, now Pat. No. 10,595,338.

(60) Provisional application No. 62/290,184, filed on Feb. 2, 2016.

(51) Int. Cl.
| | |
|---|---|
| *H04W 74/00* | (2009.01) |
| *H04W 48/20* | (2009.01) |
| *H04W 74/08* | (2009.01) |
| *H04W 84/12* | (2009.01) |

(52) U.S. Cl.
CPC ......... *H04W 74/004* (2013.01); *H04W 48/20* (2013.01); *H04W 74/0816* (2013.01); *H04W 84/12* (2013.01)

(58) Field of Classification Search
CPC ... H04W 48/06; H04W 24/08; H04W 74/002; H04W 16/14; H04W 48/20; H04W 72/1231; H04W 24/00; H04B 17/345
See application file for complete search history.

(56) References Cited

U.S. PATENT DOCUMENTS

| | | | | |
|---|---|---|---|---|
| 2006/0268933 | A1* | 11/2006 | Kellerer | H04L 67/14 370/469 |
| 2016/0330007 | A1* | 11/2016 | Cherian | H04L 1/1685 |
| 2017/0078941 | A1* | 3/2017 | Zhang | H04W 76/27 |

* cited by examiner

*Primary Examiner* — Iqbal Zaidi (57) ABSTRACT

A communication device determines, in connection with a prior uplink multi-user (UL MU) communication in which the communication device participated, whether the communication device is to use one or more first channel access parameters, or one or more second channel access parameters for accessing a communication medium for a single user (SU) transmission by the communication device, where using the one or more first channel access parameters is associated with a greater probability of obtaining access to the communication medium as compared to using the one or more second channel access parameters. Depending on the determination made, the communication device uses the one or more first channel access parameters, or the one or more second channel access parameters to attempt to access the communication medium. In response to accessing the communication medium, the communication device transmits the SU transmission via the communication medium.

21 Claims, 5 Drawing Sheets

METHODS AND APPARATUS FOR ADAPTIVE CHANNEL ACCESS

CROSS REFERENCES TO RELATED APPLICATIONS

This application is a continuation application of a U.S. patent application entitled "METHODS AND APPARATUS FOR ADAPTIVE CHANNEL ACCESS", having a Ser. No. 15/423,371, having a filing date of Feb. 2, 2017, which claims the benefit of the U.S. provisional application entitled "ADAPTIVE EDCA RULES FOR CHANNEL ACCESS IN 11ax", having a Ser. No. 62/290,184, and having a filed date of Feb. 2, 2016, having common inventors, and having a common assignee, all of which is incorporated by reference in its entirety.

FIELD OF TECHNOLOGY

The present disclosure relates generally to communication systems and, more particularly, to wireless local area networks that utilize multi-user transmissions.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, 802.11n, and 802.11ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes: determining, at a communication device and in connection with a prior uplink multi-user (UL MU) communication in which the communication device participated, whether the communication device is to use i) one or more first channel access parameters or ii) one or more second channel access parameters for accessing a communication medium for a single user (SU) transmission by the communication device, wherein using the one or more first channel access parameters is associated with a greater probability of obtaining access to the communication medium as compared to using the one or more second channel access parameters; in response to determining that the communication device is to use the one or more first channel access parameters, using, at the communication device, the one or more first channel access parameters to attempt to access the communication medium; in response to determining that the communication device is to use the one or more second channel access parameters, using, at the communication device, the one or more second channel access parameters to attempt to access the communication medium; and in response to accessing the communication medium, transmitting, with the communication device, the SU transmission via the communication medium.

In another embodiment, an apparatus comprises a network interface device associated with a communication device, the network interface device having one or more integrated circuit devices. The network interface device comprises a media access control (MAC) processor implemented on the one or more integrated circuit devices. The MAC processor includes a logic circuit implemented on the one or more integrated circuit devices, and the logic circuit is configured to: determine, in connection with a prior uplink multi-user (UL MU) communication in which the communication device participated, whether the network interface device is to use i) one or more first channel access parameters or ii) one or more second channel access parameters for accessing a communication medium for a single user (SU) transmission by the communication device, wherein using the one or more first channel access parameters is associated with a greater probability of obtaining access to the communication medium as compared to using the one or more second channel access parameters. The one or more integrated circuit devices are configured to: in response to determining that the communication device is to use the one or more first channel access parameters, use the one or more first channel access parameters to attempt to access the communication medium; in response to determining that the communication device is to use the one or more second channel access parameters, use the one or more second channel access parameters to attempt to access the communication medium; and in response to accessing the communication medium, prompt the communication device to transmit the SU transmission via the communication medium.

DETAILED DESCRIPTION

Channel access techniques described below are discussed in the context of wireless local area networks (WLANs) that utilize protocols the same as or similar to protocols defined by the 802.11. Standard (and/or future versions of the 802.11 Standard) from the Institute of Electrical and Electronics Engineers (IEEE) merely for explanatory purposes. In other embodiments, however, channel access techniques are utilized in other types of wireless communication systems (e.g., a wireless wide area network (WWAN), a cellular network, a wireless metropolitan area network (WMAN), a wireless personal area network (WEAN), etc.).

The IEEE 802.11ax Standard (still in development), also known as High-Efficiency Wireless (HEW), is an amendment to the IEEE 802.11 Standard. The IEEE 802.11ax Standard aims to improve the average throughput per user by up to four times in high-density environments. One of the features permitted by the IEEE 802.11 ax Standard is an uplink multi-user (UL MU) transmission, which involves simultaneous transmission of data from multiple client stations to an access point (AP). An UL MU transmission reduces collisions and improves spectrum efficiency. UL MU transmissions are prompted by a trigger frame from the AP. In some embodiments, in response to receiving a trigger frame, a client station disregards single user transmission channel access procedures (e.g., enhanced distributed channel access (EDCA) procedures, as defined by the IEEE 802.11 Standard), and begins transmitting as part of an UL MU transmission.

In some embodiments, a WLAN includes both i) client stations that are configured to participate in UL MU transmissions (e.g., IEEE 802.11ax compatible client stations), and ii) one or more legacy client stations (e.g., client stations that are configured to operate according to one or more earlier versions of the IEEE 802.11 Standard) that are not configured to participate in UL MU transmissions. If the IEEE 802.11 ax compatible client stations and the legacy client stations both use the same channel access parameters (e.g., the same EDCA parameters, the same backoff parameters, the same contention window parameters, etc.), this may lead to channel access unfairness in that the IEEE 802.11ax compatible client stations will be provided more access to the channel medium, as compared to legacy client stations, as a result of UL MU transmissions that disregard the channel access parameters.

In one or more embodiments described herein, a wireless network device such as an AP of a WLAN transmits data streams to one or more client stations. The AP is configured to operate with client stations according to at least a first communication protocol. The first communication protocol is sometimes referred to herein as "high efficiency WiFi," "HEW" communication protocol, "HE" communication protocol, or IEEE 802.11ax communication protocol. In some embodiments, the first communication protocol supports orthogonal frequency division multiplexing (OFDM) communication in both downlink direction from the AP to a client station and uplink direction from a client station to the AP. In an embodiment, the first communication protocol supports a single user (SU) mode in which each client station transmits a data stream to, or receives a data stream from, the AP one at a time once the client station (e.g., for UL single user (SU) transmissions), or the AP (e.g., for downlink single user (DL SU) transmissions), secures access to the medium by performing a channel access procedure (e.g., an EDCA procedure referred to in the IEEE 802.11 Standard or a similar procedure).

In some embodiments, the first communication protocol also supports one or more multi-user (MU) modes in which the AP transmits multiple independent data streams simultaneously to multiple client stations, or receives independent data streams simultaneously transmitted by multiple client stations. Multi-user transmission to, or by, multiple client stations is performed using MU multiple-input multiple-output (MU-MIMO) transmission, in which respective spatial streams are used for transmission to, or by, respective ones of the multiple client stations, and/or using orthogonal frequency division multiple access (OFDMA) transmission, in which respective frequency sub-channels of a communication channel are used for simultaneous transmission to, or by, respective ones of the multiple client stations, in various embodiments.

To improve fairness among client stations in gaining access to the communication channel, a client station configured to operate according to the first communication protocol uses adaptive channel access parameters (e.g., EDCA parameters, backoff parameters, contention window parameters, etc.) that vary depending on a current situation in which the client station is operating, according to some embodiments. For example, in at least one embodiment, a client station configured to operate according to the first communication protocol uses one or more legacy channel access parameters in some situations, and uses different (e.g., non-legacy) one or more channel access parameters in other situations. According to an embodiment, the one or more legacy channel access parameters give the client station the same chance of gaining access to the channel as legacy client stations, while the one or more different channel access parameters give the client station a smaller chance of gaining access to the channel than legacy client stations (e.g., the different channel access parameters correspond to generally longer backoff periods, generally longer contention windows, increased chances of setting longer backoff periods, etc., as compared to the legacy channel access parameters). In another embodiment, the chance to gain access to the channel differs between the client station and legacy client stations in various other ways depending on whether the legacy channel access parameters or the different channel access parameters are used.

In some embodiments, adaptive channel access parameters (e.g., EDCA parameters, backoff parameters, contention window parameters, etc.) vary depending on a current situation related to uplink multiuser transmissions. For example, in some embodiments, adaptive channel access parameters used by a client station vary depending on whether the client station has successfully completed an uplink transmission as part of an uplink multiuser transmission. As another example, in some embodiments, adaptive channel access parameters used by a client station vary depending on a length of time since the client station successfully completed an uplink transmission as part of an uplink multiuser transmission. As yet another example, in some embodiments, adaptive channel access parameters used by a client station vary depending on a length of time the client station has been attempting to access a channel medium since successfully completing an uplink transmission as part of an uplink multiuser transmission.

Figure 1:
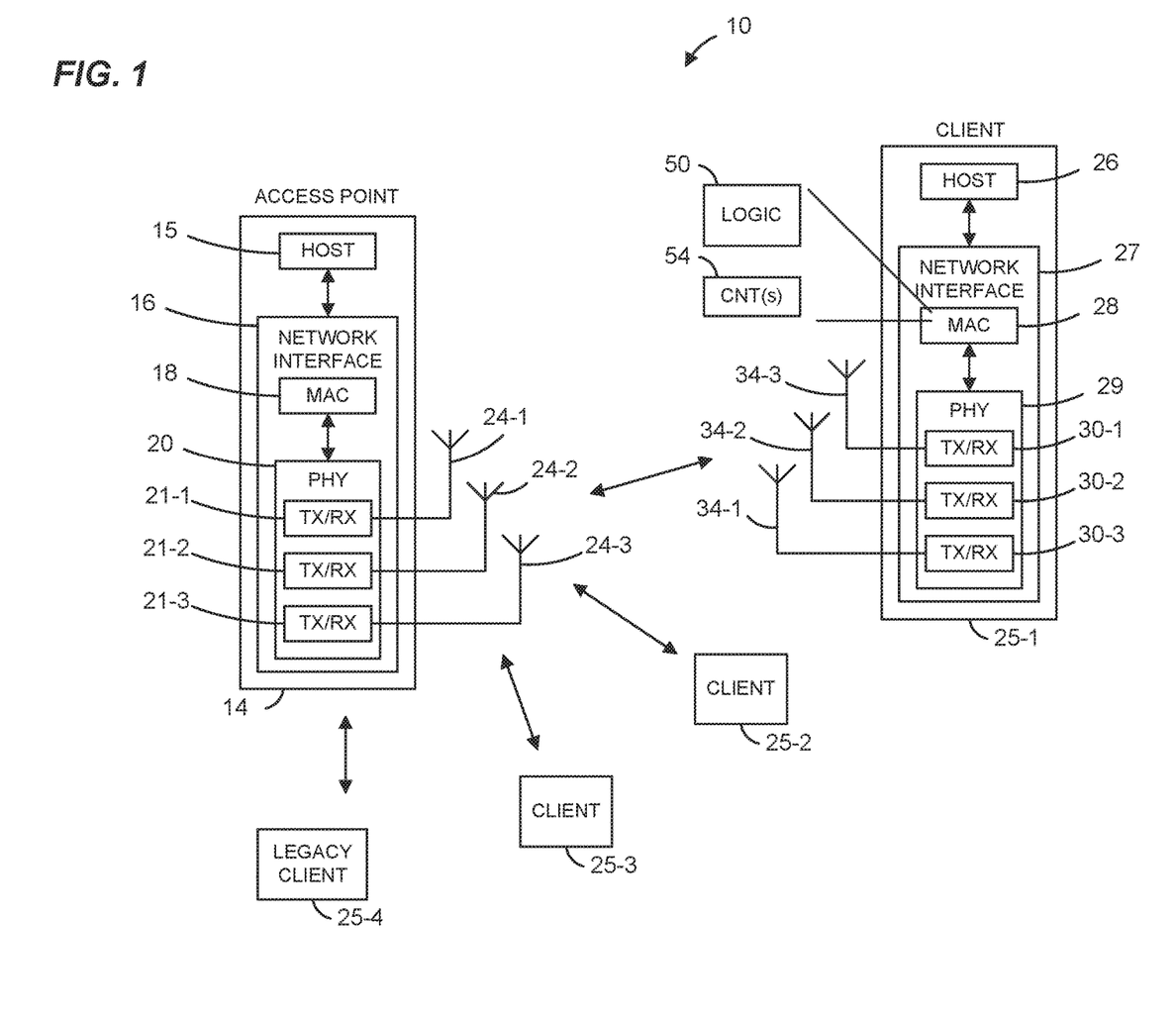
FIG. 1 is a block diagram of an example wireless local area network (WLAN), according to an embodiment of the present disclosure.

FIG. 1 is a block diagram of an example wireless local area network (WLAN) 10, according to an embodiment. The WLAN 10 supports downlink (DL) and uplink (UL) multiuser (MU) communication between an access point (AP) and a plurality of client stations. It should be noted that while one WLAN 10 is depicted in FIG. 1, this is only intended to be illustrative, and any suitable number of WLANs may be present.

In an embodiment, the WLAN includes at least one access point (AP) 14. The configuration of the AP 14 varies among different embodiments, but a typical configuration will now be described, using AP 14 as an example. The AP 14 includes a host processor 15 coupled to a network interface device 16. The network interface device 16 includes a medium access control (MAC) processor 18 and a physical layer (PHY) processor 20. The PHS' processor 20 includes a plurality of transceivers 21, and the transceivers 21 are coupled to a plurality of antennas 24. Although three transceivers 21 and three antennas 24 are illustrated in FIG. 1, in one or more embodiments the AP 14 includes other suitable numbers (e.g., 1, 2, 4, 5, etc.) of transceivers 21 and/or antennas 24. Although AP 14 includes the same number of antennas 24 and transceivers 21, in some embodiments the AP 14 includes a different number of antennas 24 than transceivers 21, and antenna switching techniques are utilized.

In an embodiment, the network interface device 16 includes a wired communication interface for exchanging one or more of i) communication protocol data units (e.g., Internet protocol (IP) packets, transmission control protocol (TCP) packets, etc.), ii) wireless network management parameters, iii) wireless network status information, etc., with the host processor 15.

In an embodiment, the MAC processor 18 and the PHY processor 20 include respective wired communication interfaces configured to exchange one or more of i) communication protocol data units (e.g., MAC layer service data units (MSDUs), PHY service data units (PSDUs), etc.), ii) wireless network management information, iii) wireless network status information, etc., between the MAC processor 18 and the PHY processor 20. In an embodiment, the wired communication interface of the MAC processor 18 is coupled to the wired communication interface of the PHY processor 20.

In some embodiments, the one or more transceivers 21 include radio frequency (RF) circuitry configured to upconvert baseband signals generated by baseband transmit components the PHY processor 20 to RF signals for wireless transmission via the one or more antennas 24. In some embodiments, the one or more transceivers 21 include RF circuitry for downconverting RF signals wirelessly received via the one or more antennas 24 to baseband signals for processing by baseband receive components of the PHY processor 20.

In one or more embodiments, the network interface device 16 is implemented on one or more integrated circuit (IC) devices configured to operate as described below. For example, in an embodiment, at least a portion of the MAC processing unit 18 is implemented on a first IC device and at least a portion of the PRY processing unit 20 is implemented on a second IC device. As another example, at least a portion of the MAC processing unit 18 and at least a portion of the PHY processing unit 20 are implemented on a single IC device, according to an embodiment.

In an embodiment, baseband transmit components of the PHY processor 20, baseband receive components of the PHY processor 20, and the one or more transceivers 21 are implemented on a single IC.

In another embodiment, baseband transmit components of the PHY processor 20 and baseband receive components of the PHY processor 20 are implemented on a first IC, and the one or more transceivers 21 are implemented on a second IC. In such an embodiment, the first IC and the second IC include respective wired communication interfaces configured to exchange i) baseband signals corresponding to signals for wireless transmission via the one or more antennas 24, and ii) baseband signals corresponding to signals wireless received via the one or more antennas 24, between the first IC and the second IC. In an embodiment, the wired communication interface of the first IC is coupled to the wired communication interface of the second IC.

In some embodiments, the MAC processor 18 and/or the PHY processor 20 are configured to operate according to a first communication protocol (e.g., a High Efficiency, HE, or 802.11ax communication protocol) that supports UL MU transmissions. In some embodiments, the MAC processor 18 and/or the PHY processor 20 are also configured to operate according to one or more second communication protocols, such as a "legacy" protocol that does not support CM MU transmissions (e.g., according to the IEEE 802.11n Standard and/or the IEEE 802.11ac Standard).

The WLAN 10 includes a plurality of client stations 25. Although four client stations (25-1, 25-2, 25-3, and 25-4) are illustrated in FIG. 1, in various scenarios and embodiments the WLAN 10 includes other suitable numbers (e.g., 1, 3, 4, 5, 6, etc.) of client stations 25. The configuration of the client station 25 varies among different embodiments, but a typical configuration will now be described using client station 25-1 as an example. The client station 25-1 includes a host processor 26 coupled to a network interface device 27. In an embodiment, the network interface device 27 includes one or more ICs configured to operate as described below. The network interface device 27 includes a MAC processor 28 and a PHY processor 29. The PRY processor 29 includes a plurality of transceivers 30, and the transceivers 30 are coupled to a plurality of antennas 34. Although three transceivers 30 and three antennas 34 are illustrated in FIG. 1, in one or more embodiments the client station 25-1 includes other suitable numbers (e.g., 1, 2, 4, 5, etc.) of transceivers 30 and/or antennas 34. Although the client station 25-1 includes the same number of antennas 34 and transceivers 30, in some embodiments the client station 25-1 includes a different number of antennas 34 than transceivers 30, and antenna switching techniques are utilized.

In one or more embodiments, the network interface device 27 is implemented on one or more IC devices. For example, in an embodiment, at least a portion of the MAC processor 28 is implemented on at least a first IC device, and at least a portion of the PRY processor 29 is implemented on at least a second IC device. In another embodiment, at least a portion of the MAC processor 28 and at least a portion of the PHY processor 29 are implemented on a single IC device.

In some embodiments, the network interface 27 (e.g., the MAC processing unit 29 and the PHY processing unit 30) of the client station 25-1 is configured to operate according to the first communication protocol. In some embodiments, the network interface 27 (e.g., the MAC processing unit 29 and the PHY processing unit 30) is also configured to operate according to one or more second communication protocols.

In an embodiment, one or more of the client stations 25-2, 25-3, and 25-4 has a structure that is the same as or similar to the client station 25-1. In these embodiments, the one or more client stations 25 structured the same as or similar to the client station 25-1 has the same or a different number of transceivers and antennas. For example, the client station 25-2 has only two transceivers and two antennas (not shown), according to an embodiment.

In an embodiment, the client station 25-4 is not configured to participate in UL MU transmissions, e.g., the client station 25-4 is configured to operate according to one or more second communication protocols, such as a "legacy" protocol that does not support UL MU transmissions (e.g., according to the IEEE 802.11n Standard and/or the IEEE 802.11ac Standard), but is not configured to operate according to the first communication protocol that supports UL MU transmissions. Client stations that are not configured to participate in UL MU transmissions are sometimes referred to herein as "legacy client stations". Client stations that are configured to participate in UL MU transmissions are sometimes referred to herein as "non-legacy client stations".

In various embodiments, the MAC processor 18 of the AP 14 is configured to perform MAC functions defined by the first communication protocol, and the PHY processor 20 is configured to perform PHY functions defined by the first communication protocol. For example, in one or more embodiments, the MAC processor 18 and/or the PHY processor 20 of the AP 14 are configured to generate data units conforming to the first communication protocol and having formats described herein. In an embodiment, the MAC processor 18 of the AP 14 is configured to generate MAC layer service data units (e.g., MSDUs) such as data frames, control frames, etc., and provide at least some of the MSDUs to the PHY processor 20 of the AP 14. In some embodiments, the PHY processor 20 is configured to receive MAC layer data units (e.g., MSDUs) from the MAC processor 18 and encapsulate the MAC layer data units to generate PRY data units such as PRY protocol data units (PPDUs) for transmission via the antennas 24. Similarly, in an embodiment, the PRY processor 20 is configured to receive PHY data units that were received via the antennas 24, and extract MAC layer data units encapsulated within the received PRY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. In some embodiments, the MAC processor 18 and/or the PRY processor 20 of the AP 14 are configured to process a received data unit conforming to the first communication protocol and having a format described hereinafter, and to determine that such a data unit conforms to the first communication protocol, according to various embodiments.

In one or more embodiments, the MAC processor 28 of the client device 25-1 is configured to perform MAC functions defined by the first communication protocol, and the PHY processor 29 is configured to perform PHY functions defined by the first communication protocol. For example, in various embodiments, the MAC processor 28 and/or the PHY processor 29 of the client device 25-1 are configured to generate data units conforming to the first communication protocol and having formats described herein. For example, in an embodiment, the MAC processor 28 is configured to generate MAC layer service data units (e.g., MSDUs) such as data frames, control frames, etc., and provide at least some of the MSDUs to the PRY processor 29. In an embodiment, the PRY processor 29 is configured to receive MAC layer data units (e.g., MSDUs) from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the received PRY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. In some embodiments, the MAC processor 28 and/or the PHY processor 29 of the client device 25-1 are configured to process a received data unit conforming to the first communication protocol and having a format described herein, and to determine that such a data unit conforms to the first communication protocol, according to various embodiments.

In an embodiment, the AP 14 is configured to operate according to a wireless communication protocol that utilizes Orthogonal Frequency Multiple Division Access (OFDMA) technology and/or multi-user multiple-input, multiple-output (MU-MIMO) technology.

In an embodiment, the MAC processor 28 includes a logic circuit 50 configured to determine whether the network interface device 27 (e.g., the MAC processor 28) is to use i) one or more first channel access parameters or ii) one or more second channel access parameters for accessing a communication medium corresponding to the network 10. Various techniques for determining whether the network interface device 27 is to use i) the one or more first channel access parameters or ii) the one or more second channel access parameters, according to various embodiments, are discussed in more detail below.

In some embodiments, the MAC processor 28 further includes one or more counter circuits 54 (referred to herein as "counters") coupled to, or included in, the logic circuit 50. In some embodiments, the logic circuit 50 uses the one or more counters 54, at least in some scenarios, to determine whether the network interface device 27 is to use i) the one or more first channel access parameters or ii) the one or more second channel access parameters. Various techniques for using one or more counters 54 in connection with determining whether the network interface device 27 is to use i) the one or more first channel access parameters or ii) the one or more second channel access parameters, according to various embodiments, are discussed in more detail below. In an embodiment, the one or more counters 54 are, or include, timer circuits (referred to herein as "counters"). In an embodiment, the one or more counters 54 are separate than any backoff counters included in and/or utilized by the network interface device 27.

In an embodiment, the logic circuit 50 includes a hardware state machine. In an embodiment, the network interface device 27 and/or the MAC processor 28 includes a processor coupled to a memory that stores machine readable instructions, where the processor is configured to execute the machine readable instructions stored in the memory; in an embodiment, the logic circuit 50 is included in the processor, and functionality of the logic circuit 50 is implemented by the processor executing machine readable instructions stored in the memory.

Figure 2:
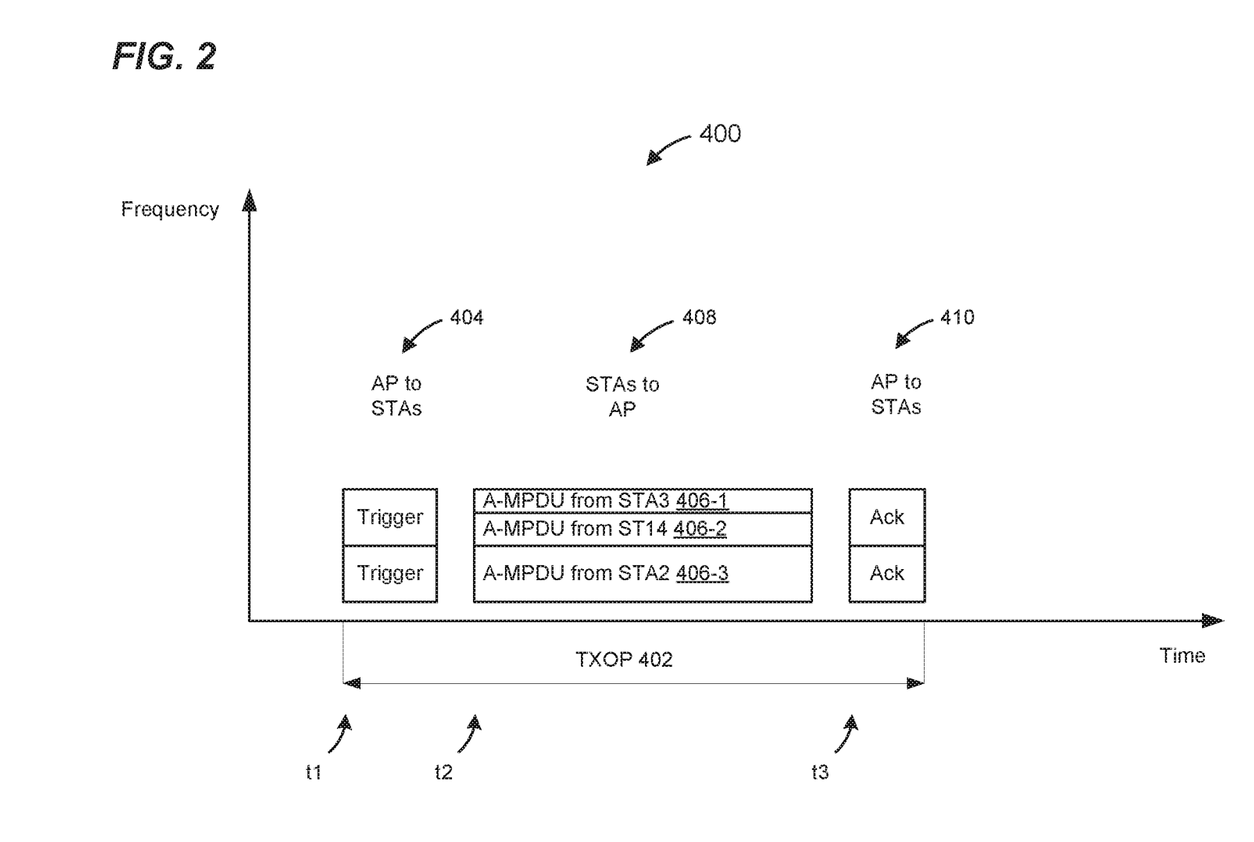
FIG. 2 is a diagram of an example transmission sequence corresponding to an uplink multi-user communication in a WLAN, according to an embodiment of the present disclosure.

FIG. 2 is a diagram of an example UL MU transmission sequence 400 in a WLAN, such as the WLAN 10 of FIG. 1, according to an embodiment. In the example transmission sequence 400, an AP (e.g., AP 14 in the example network 10 shown in FIG. 1) triggers a UL MU transmission (e.g., an UL OFDMA transmission) by multiple non-legacy client stations, such as multiple ones of the non-legacy client stations 25, during a transmission opportunity period (TXOP) 402.

Beginning at a time t1, the AP 14 transmits a trigger frame 404 to a plurality of client stations (e.g., client stations 25-1, 25-2, and 25-3 in the example network 10 shown in FIG. 1). In an embodiment, the TXOP 402 is obtained by (e.g., based on a suitable channel assessment procedure, such as a carrier sense multiple access with collision avoidance (CSMA/CA) procedure, a backoff procedure, etc.), or scheduled for, the AP 14.

In an embodiment, the trigger frame 404 is included in a physical layer convergence protocol (PLOP) data unit (PPDU). In an embodiment and/or scenario, the trigger frame 404 is duplicated in each channel (e.g., in each 20 MHz channel) of the entire bandwidth of the TXOP 402. In an embodiment in which the trigger frame 404 is included in a legacy PPDU that is duplicated in each channel (e.g., in each 20 MHz channel) of the entire bandwidth of the TXOP 402, the communication medium is protected from, interference by any device in the network over the entire bandwidth of the TXOP 402, at least for the duration defined by a duration field of the trigger frame 404, or for the duration of the entire TXOP 402. In another embodiment and/or scenario, the trigger frame 404 occupies the entire bandwidth of the TXOP 402, for example, when each of the client stations 25 to which the trigger frame 404 is transmitted is capable of operating in the entire bandwidth of the TXOP 402. In an embodiment, a trigger frame that occupies the entire bandwidth of the TXOP 402 is relatively shorter, and accordingly is transmitted in a relatively shorter time period, as compared to a trigger frame that is duplicated in each narrowest channel bandwidth of the TXOP 402.

In accordance with an embodiment, time t2 at each non-legacy client station 25 participating in the UL MU transmission begins upon expiration of a predetermined time interval, such as for example a time interval corresponding to a short hater-frame space (SIFS) defined by the IEEE 802.11 Standard or another suitable predetermined time interval, after completion of reception of the trigger frame 404 at the client station 25. In another embodiment, a predetermined time period that is greater than SIFS is defined, and time t2 at each client station 25 begins upon expiration of a predetermined time interval corresponding to the predetermined time interval greater than SIFS. For example, a predetermined time period that is greater than SIFS and less than a point coordination function (PGF) interframe space (PIFS), as defined, by the IEEE 802.11 Standard, is utilized. The greater predetermined time interval may provide sufficient time for the client stations 25 to decode the trigger frame 404 and to prepare for uplink transmission based on the uplink scheduling information provided by the trigger frame 404, in at least some embodiments.

In an embodiment, each client station begins transmission of a respective OFDM data unit 406 at the time t2 in a respective sub-channel, allocated to the client station. In other embodiments, each of at least some of the client stations begins transmission of a respective OFDM data unit 406 at the time t2 in across multiple sub-channels using MU MIME) techniques.

At a time t3, the AP (e.g., AP 14 in the example network 10 shown in FIG. 1) begins transmission of respective acknowledgement (ACK) frames 410 to the client stations 25 (STA1 through STA3) acknowledging receipt of the OFDM data units 406 from the client stations 25. In another embodiment, the AP 14 transmits a broadcast acknowledgement frame that includes respective acknowledgements for the client stations 25 (STA1 through STA3). In at least one embodiment, time t3 begins upon expiration of a predetermined time interval, such as, for example, a time interval corresponding to SIFS, after completion of reception of the UL MU transmission 408 at the AP 14. In an embodiment, the AP 14 transmits the ACK frames 410 to the client stations 25, as parts of an OFDMA transmission to the client stations 25, in the respective sub-channels allocated to the client stations 25 as indicated in the trigger frame 404. In another embodiment, the ACK 410, or a portion of the ACK 410, is a MU MIMO transmission that spans multiple sub-channels.

In an embodiment, non-legacy client stations are also configured to utilize UL SU transmissions. For example, in some scenarios, a non-legacy client station will choose not to wait until a next trigger frame from the AP to conduct an UL transmission, and instead will attempt to gain access to the communication medium and transmit an UL SU transmission. This may occur, for example, when the non-legacy client station has a large volume of data to transmit and/or has a high priority transmission. When attempting to gain access to the communication medium for an UL SU transmission, these client stations often will be competing with legacy client stations and other non-legacy client stations.

In one or more embodiments, the AP and the client stations (e.g., AP 14 and client stations 25 in the example network 10 shown in FIG. 1) contend for communication medium using carrier sense multiple access with collision avoidance (CSMA/CA) protocol or another suitable medium access protocol. In an embodiment, the AP and the client stations implement a clear channel assessment (CCA) procedure, in which the AP/client station determines the energy level of the medium in order to determine whether the medium is busy or idle. If the medium is idle, the device can count down a backoff counter. If the backoff counter reaches a predetermined number (e.g., 0), the device can transmit. If the medium becomes busy, the device pauses the backoff counter and waits until the medium becomes idle again, and then continues counting down the backoff counter while the medium is idle.

In some embodiments, the backoff counter is initialized with a value determined based on a parameter such as a contention window (CW) parameter. For example, in an embodiment, the initial value of the backoff counter is randomly, or pseudo-randomly, chosen as a value between 0 and CW. If a client station determines that a collision with its transmission occurred, the client station will double CW, choose a value for the backoff counter as a value between 0 and CW, and restart the backoff counter. This procedure continues (up to a maximum value of CW ($CW_{max}$)). When the client station determines that it has successfully completed a transmission, the client station resets CW to a minimum of initial value of CW ($CW_{min}$).

If the $CW_{min}$ parameter is increased, the backoff period (as measured by the backoff counter) tends to increase. If a first backoff period utilized by a first client station is longer than a second backoff period utilized by a second client station, the first client station will tend to have more difficulty obtaining access to a channel medium as compared to the second client station. Thus, in an embodiment, increasing the $CW_{min}$ parameter utilized by a station tends to increase the difficulty of obtaining access to a channel medium when other stations are utilizing a smaller parameter.

Non-legacy client stations will often be competing with legacy client stations when attempting to gain access to the communication medium for an UL SU transmission. Thus, the non-legacy client stations will be utilizing a backoff counter, a CSMA/CA protocol, etc. in a manner similar to the legacy client stations when attempting to gain access to the communication medium for an UL SU transmission, according to at least some embodiments.

For UL MU transmissions, however, the non-legacy client stations will disregard any backoff counters, CSMA/CA protocols, etc., and instead will simply begin transmitting a predetermined time period after an end of the trigger frame from the AP, according to some embodiments.

In some embodiments, a non-legacy client station (e.g., client station 25-1) selectively utilizes a first set of channel access parameters or a second set of channel access parameters (also referred to herein simply as "first channel access parameters" and "second channel access parameters") for initiating transmission of an UL SU data unit. In an embodiment, the first and second channel access parameters include backoff parameters (e.g., CW parameters). In an embodiment, the non-legacy client station uses the first channel access parameters in some situations, and uses the second channel access parameters in other situations, where the first channel access parameters are different from the second channel access parameters. The first channel access parameters are sometimes referred to herein as "legacy channel access parameters," and the second channel access parameters are sometimes referred to herein as "non-legacy channel access parameters."

For example, in an embodiment, the legacy channel access parameters generally give the non-legacy client station a same chance of gaining access to the communication channel as a legacy client station. In one or more embodiments, the legacy client stations use only the legacy channel access parameters to gain access to the communication channel, while the client stations configured to operate according to the first communication protocol use the legacy channel access parameters or the non-legacy channel access parameters depending on a current situation.

In an embodiment, the non-legacy channel access parameters give the client station configured to operate according to the first communication protocol a smaller chance of gaining access to the communication channel as compared to the legacy client station. For example, in an embodiment, the non-legacy channel access parameters include a larger $CW_{min}$ as compared to the legacy channel access parameters. In one or more other embodiments, the chance of gaining access to the communication channel differs between the non-legacy client station and the legacy client station in various other ways depending on whether the first channel access parameters or the second channel access parameters are used.

In an embodiment, a non-legacy client station initially uses the legacy channel access parameters to gain access to the communication channel following association establishment with an AP. For example, in an embodiment, upon receiving an association response frame that the AP transmits to the non-legacy client station during association establishment with the non-legacy client station, the non-legacy client station uses the legacy channel access parameters to initiate one or more transmissions of one or more UL SU data units.

In an embodiment, the non-legacy client station continues using the legacy channel access parameters until the non-legacy client station successfully completes a trigger-based UL transmission as part of an UL MU transmission. In such an embodiment, if the non-legacy client station receives an acknowledgement (ACK) frame from the AP acknowledging receipt of the UL data unit transmitted by the non-legacy client station in response to receiving a trigger frame, the non-legacy client station then begins using the non-legacy channel access parameters for subsequently gaining access to the communication channel. In an embodiment, the non-legacy channel access parameters include a larger $CW_{min}$ as compared to a $CW_{min}$ included in the legacy channel access parameters.

In an embodiment, the non-legacy client station uses the non-legacy channel access parameters for a pre-determined period of time (e.g., following the receipt at the client station of the ACK frame from the AP acknowledging receipt of the UL data unit transmitted by the client station in response to the trigger frame from the AP). For example, in an embodiment, upon reception at the client station of the ACK frame from the AP, the client station activates (e.g., starts, initiates, etc.) a timer (e.g., a counter clocked at a fixed rate, etc.) to define a period of time during which the client station is to use the non-legacy channel access parameters for gaining access to the communication channel. In an embodiment, upon reception at the client station of the ACK frame from the AP, one or more timers (e.g., counters) are activated for defining respective periods of time during which the client station is to use the non-legacy channel access parameters for gaining access to the communication channel, where each timer corresponds to a respective access category (e.g., a priority level in enhanced distributed channel access (EDCA)) for accessing the channel. In some embodiments, each timer corresponds to a different access category, a different traffic class, a different priority level, etc.

In accordance with some embodiments, the period of time during which a non-legacy client station configured to operate according to the first communication protocol is to use the non-legacy channel access parameters is based on an indication transmitted to the non-legacy station by the AP. For example, in an embodiment, the client station receives from the AP an indication of the period of time during which the client station is to use the non-legacy channel access parameters. In an embodiment, the AP indicates the period of time to the client station during association establishment (e.g., the AP includes an indication of the period of time in an association response frame). In some embodiments, the period of time during which the client station configured to operate according to the first communication protocol is to use the non-legacy channel access parameters is updated by the AP, for example, each beacon interval, according to an embodiment. In some embodiments, the AP includes an indication of the period of time in a beacon frame. In some embodiments, the AP includes an indication of the period of time in another suitable frame transmitted to the non-legacy client station, such as a control frame, a management frame, etc.

Figure 3:
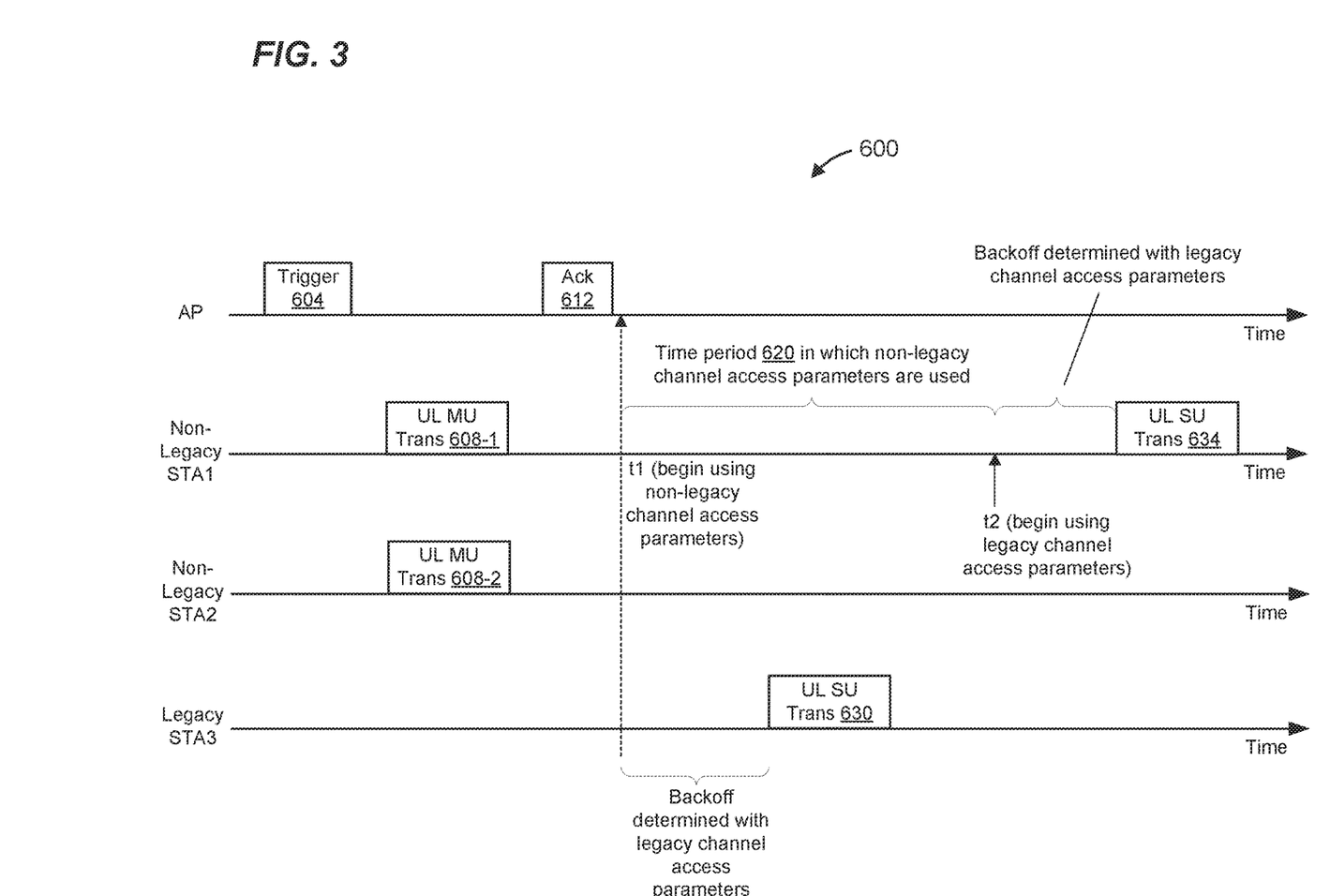
FIG. 3 is a diagram of another example transmission sequence in a WLAN, according to an embodiment of the present disclosure.

FIG. 3 is a block diagram of an example transmission sequence 600 in a WLAN, such as the example WLAN 10 shown in FIG. 1, in which a non-legacy client station (STA1) utilizes dynamic channel access parameters for uplink transmissions, according to an embodiment. In the example scenario illustrated in FIG. 3, the WLAN includes an AP, the non-legacy STA1, a non-legacy STA2, and a legacy STA3.

In an embodiment, the non-legacy STA1 (e.g., the client station 25-1 in the example network 10 shown in FIG. 1) and the non-legacy STA2 (e.g., the client station 25-2 in FIG. 1) are client stations configured to operate according to the first communication protocol. In an embodiment, the legacy STA3 (e.g., the client station 25-4 in the example network 10 shown in FIG. 1) is a client station configured to operate according to a legacy communication protocol, but is not configured to operate according to the first communication protocol.

The AP transmits a trigger frame 604 to prompt an UL MU transmission from a group of client stations that includes the non-legacy STA1 and the non-legacy STA2. In response to receiving the trigger frame 604, the non-legacy STA1 transmits 608-1 as part of the UL MU transmission, and the non-legacy STA2 transmits 608-2 as part of the UL MU transmission. In the scenario illustrated in FIG. 3, the AP successfully receives the UL MU transmission 608 and, in response, transmits an acknowledgment (ACK) 612. At a time t1, the non-legacy STA1 determines that the AP successfully received the transmission 608-1 based on the non-legacy STA receiving the ACK 612 from the AP.

In the example scenario of FIG. 3, the non-legacy STA1 uses legacy channel access parameters during a time period prior to and up to time t1 for gaining access to the channel medium for UL SU transmissions. For instance, in one illustrative example, the transmission 608-1 was the first successful UL MU transmission by the non-legacy STA1 since the non-legacy STA1 became associated with the AP, and the non-legacy STA1 has been using the legacy channel access parameters since becoming associated with the AP. As another illustrative example, the non-legacy STA1 had earlier used non-legacy channel access parameters but had switched to using legacy channel access parameters, and the transmission 608-1 was the first successful UL MU transmission by the non-legacy STA1 since the non-legacy STA1 switched to using legacy channel access parameters.

In response to determining, at time t1, that the AP successfully received the transmission 6084, the non-legacy STA1 begins using non-legacy channel access parameters. Also in response to determining, at time t1, that the AP successfully received the transmission 608-1, and/or in response to beginning use of the non-legacy channel access parameters, the non-legacy STA1 starts a counter for measuring a time period 620 in which the non-legacy STA1 is to use the non-legacy channel access parameters. In an embodiment, the timer (e.g., counter) is initialized with an initial value corresponding to the time period 620, and the counter counts down from the initial value to zero. In another embodiment, the timer is initialized with a predetermined value such as zero, and the counter counts up until it reaches an ending value corresponding to a sum of the predetermined value and a value corresponding to the time period 620. In another embodiment, an initial value of the timer corresponding to time t1 is recorded, and the counter counts up until it reaches an ending value corresponding to a sum of the initial value and a value corresponding to the time period 620. In another embodiment, an initial value of the timer corresponding to time t1 is recorded, and the counter counts down until it reaches an ending value corresponding to the initial value minus a value corresponding to the time period 620. In some embodiments, the non-legacy STA1 maintains multiple counters for measuring respective time periods 620 in which the non-legacy STA1 is to use the non-legacy channel access parameters, where the respective time periods 620 correspond to different access categories, traffic classes, priority levels, etc.

On the other hand, the legacy STA3 uses the legacy channel access parameters. As discussed above, uses of the legacy channel access parameters, as compared to use of the non-legacy channel access parameters, tends to provide a greater probability of acquiring access to the channel medium. Thus, in the illustrative example of FIG. 3, the legacy STA3 acquires access to the channel medium prior to the non-legacy STA1, which is using the non-legacy channel access parameters. Upon the legacy STA3 acquiring access to the channel medium, the legacy STA3 transmits an UL SU frame 630.

At a time t2, the non-legacy STA1 determines that the counter reached an end value corresponding to expiration of the time period 620. In response, the non-legacy STA1 switches to using the legacy channel access parameters. The non-legacy STA1 then acquires access to the channel medium, using the legacy channel access parameters, and upon acquiring access to the channel medium, the legacy STA3 transmits an SU frame 634.

Figure 4:
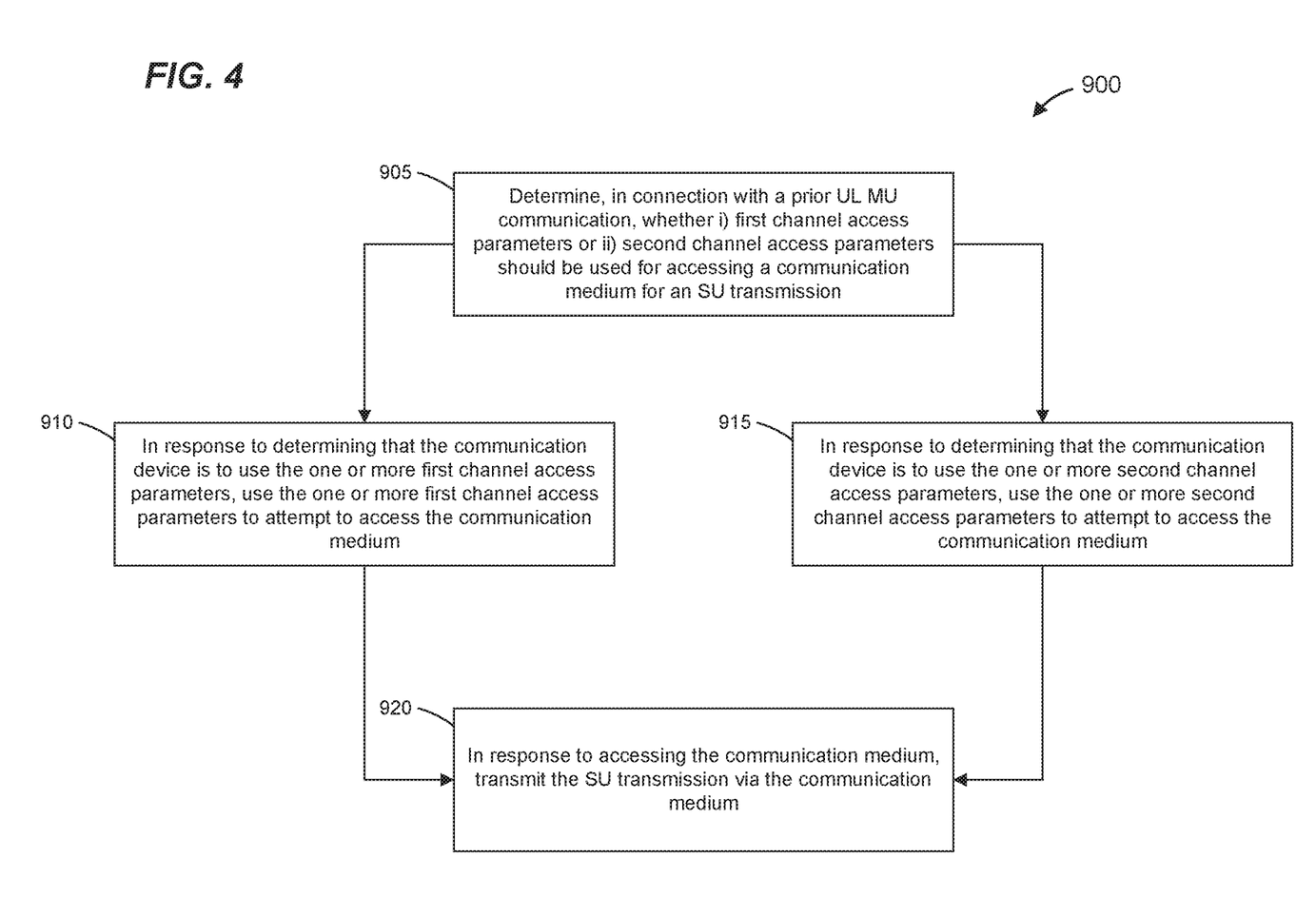
FIG. 4 is a flow diagram of an example method for communicating in a wireless communication network, according to an embodiment of the present disclosure.

FIG. 4 is a flow diagram of an example method 900 for communicating in a communication channel of a wireless communication network, in accordance with one or more embodiments. In some embodiments, the example method 900 is implemented by a client station (e.g., client station 25-1 as shown in FIG. 1). As an example, the network interface device 27 is configured to implement the method 900, according to some embodiments. For example, in one such embodiment, the MAC processing unit 28 is configured to implement at least a portion of the method 900. As another example, the MAC processor 28 is configured to implement a first portion of the method 900, and the PHY processor 29 is configured to implement a second portion of the method 900, according to an embodiment. In other embodiments, the method 900 is implemented by other suitable network interface devices.

At block 905, a communication device determines, in connection with a prior UL MU communication in which the communication device participated, whether the communication device is to use i) one or more first channel access parameters or ii) one or more second channel access parameters for accessing a communication medium for a single user (SU) transmission by the communication device. In an embodiment, the one or more first channel access parameters include one or more legacy channel access parameters such as discussed above. In an embodiment, the one or more second channel access parameters include one or more non-legacy channel access parameters such as discussed above. In an embodiment, using the one or more first channel access parameters are associated with a greater probability of obtaining access to the communication medium as compared to using the one or more second channel access parameters.

In an embodiment, block 905 is implemented by a MAC processor such as the MAC processor 28. In an embodiment, block 905 is implemented by a logic circuit such as the logic circuit 50.

In an embodiment, block 905 comprises using a counter, such as the counter 54 (FIG. 1), to determine whether a time period has expired. In an embodiment, block 905 comprises determining whether a transmission by the communication device as part of the prior UL MU communication was successful. In an embodiment, determining whether the transmission by the communication device as part of the prior UL MU communication was successful includes determining whether the communication device received an ACK responsive to the transmission by the communication device as part of the prior UL MU communication.

At block 910, the communication device uses the one or more first channel access parameters to attempt to access the communication medium in response to determining, at block 905, that the communication device is to use the one or more first channel access parameters.

At block 915, the communication device uses the one or more second channel access parameters to attempt to access the communication medium in response to determining, at block 905, that the communication device is to use the one or more second channel access parameters.

In an embodiment, blocks 910 and 915 are implemented by a MAC processor such as the MAC processor 28.

At block 920, the communication device transmits an SU transmission via the communication medium in response to accessing the communication medium via either block 910 or 915. In an embodiment, block 920 includes a MAC processor, such as the MAC processor 28, prompting a PHY processor, such as the PHY processor 29, to provide one or more baseband signals to one or more RF circuits, the one or more baseband signals corresponding to the SU transmission. In an embodiment, block 920 includes one or more RF circuits providing one or more RE signals to one or more antennas, the one or more RF signals corresponding to the SU transmission.

Figure 5:
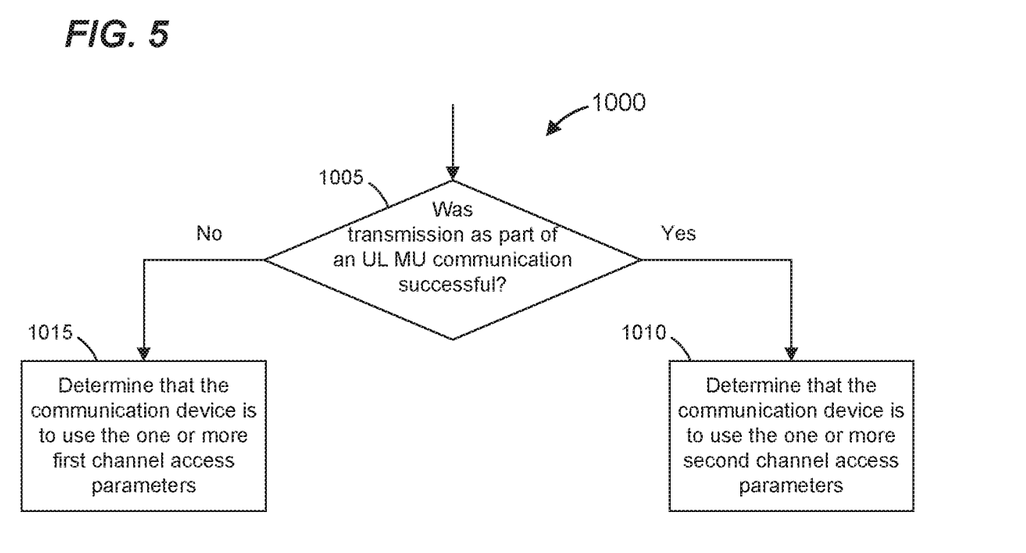
FIG. 5 is a flow diagram of an example method for determining one or more channel access parameters to utilize, according to an embodiment of the present disclosure.

FIG. 5 is a flow diagram of an example method 1000 for determining, in connection with a prior UL MU communication in which the communication device participated, whether the communication device is to use i) one or more first channel access parameters or ii) one or more second channel access parameters for accessing a communication medium for a SU transmission by the communication device, in accordance with one or more embodiments. In some embodiments, the example method 1000 is implemented by a client station (e.g., client station 25-1 as shown in FIG. 1). As an example, the network interface device 27 is configured to implement the method 1000, according to some embodiments. For example, in one such embodiment, the MAC processing unit 28 is configured to implement at least a portion of the method 1000. In one embodiment, the logic circuit 50 is configured to implement at least a portion of the method 1000.

Referring now to FIGS. 4 and 5, in an embodiment, block 905 includes the method 1000. In other embodiments, however, block 905 includes another suitable method.

In an embodiment, the method 1000 is performed in connection with a communication device having participated in a prior UL MU communication.

At block 1005, the communication device determines whether a transmission by the communication device, as part of the prior UL MU communication, was successful. In an embodiment, block 1005 includes determining whether the communication device received an ACK from another communication device (e.g., an AP) responsive to the transmission by the communication device as part of the prior UL MU communication. For example, in an embodiment, receipt of the ACK indicates that the transmission was successful, whereas if an ACK is not received within a predetermined time after the transmission was completed, this may indicate that the transmission was not successful. In some embodiments, when block ACKs are utilized, a client device may not determine whether a transmission was successful until after having participated in multiple UL MU communications.

If it is determined at block 1005 that the transmission was successful, the flow proceeds to block 1010. At block 1010, the communication device determines that the communication device is to use the one or more second channel access parameters.

On the other hand, if it is determined at block 1005 that the transmission was not successful, the flow proceeds to block 1015. At block 1015, the communication device determines that the communication device is to use the one or more first channel access parameters. For example, in an embodiment, the communication device determines whether i) to set a new backoff counter according to the one or more first channel access parameters, or ii) to resume the existing backoff counter; then starts the new backoff counter or resumes the existing backoff counter. In an embodiment, the communication device sets a new backoff counter according to the one or more first channel access parameters in response to determining (at block 1005) that the transmission was not successful. In an embodiment, the communication device resumes the existing backoff counter in response to determining (at block 1005) that the transmission was not successful.

Figure 6:
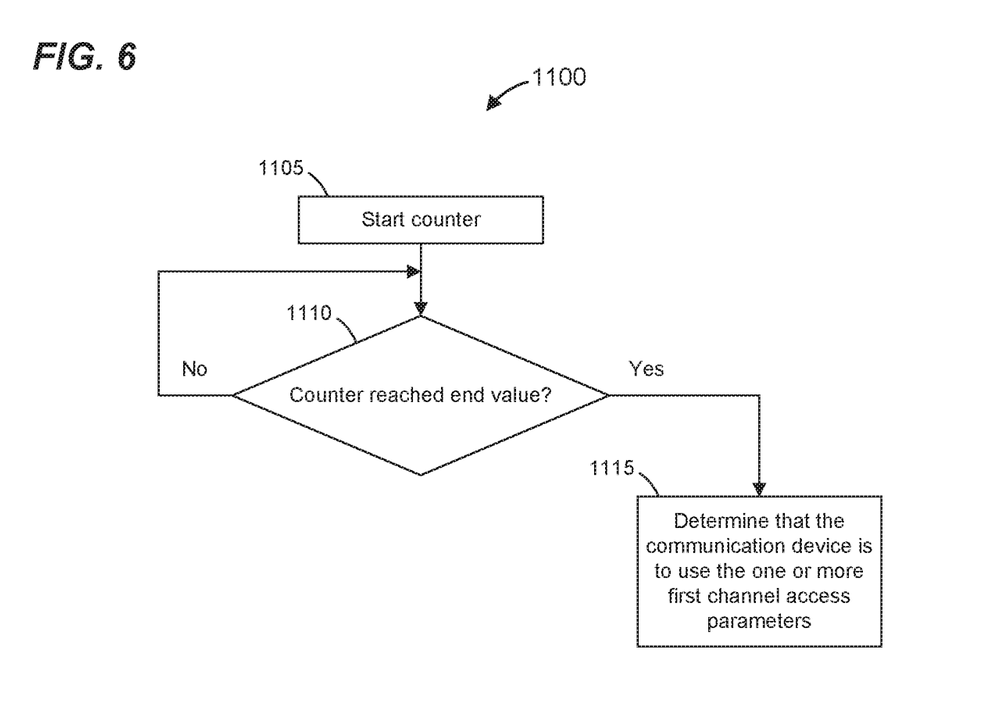
FIG. 6 is a flow diagram of another example method for determining one or more channel access parameters to utilize, according to an embodiment of the present disclosure.

FIG. 6 is a flow diagram of an example method 1100 for determining whether a communication device is to use i) one or more first channel access parameters or ii) one or more second channel access parameters for accessing a communication medium for a SU transmission by the communication device, in accordance with one or more embodiments. In some embodiments, the example method 1100 is implemented by a client station (e.g., client station 25-1 as shown in FIG. 1). As an example, the network interface device 27 is configured to implement the method 1100, according to some embodiments. For example, in one such embodiment, the MAC processing unit 28 is configured to implement at least a portion of the method 1100. In one embodiment, the logic circuit 50 is configured to implement at least a portion of the method 1100.

Referring now to FIGS. 4 and 6, in an embodiment, block 905 includes the method 1100. In other embodiments, however, block 905 includes another suitable method.

Referring now to FIGS. 4-6, in an embodiment, block 905 includes the method 1000 and also includes the method 1100. In other embodiments, however, block 905 includes only one of, or neither of, the method 1000 and the method 1100.

In an embodiment, the method 1100 is performed in connection with a communication device having successfully completed a transmission as part of a prior UL MU communication. In an embodiment, the method 1100 is performed in connection with a communication device having determined to use the one or more second channel access parameters. In an embodiment, the method 1100 is performed in connection with a communication device having determined to use the one or more second channel access parameters in response to determining that communication device successfully completed a transmission as part of a prior UL MU communication.

At block 1105, the communication device starts a counter. In an embodiment, the communication device starts a counter in connection with one or both of i) determining that communication device successfully completed a transmission as part of a prior UL MU communication, and ii) determining that the communication device is to use the one or more second channel access parameters. In an embodiment, the logic circuit 50 starts the counter 54.

In an embodiment, block 1105 includes causing the counter to begin incrementing. In an embodiment, block 1105 includes causing the counter to begin decrementing.

In an embodiment, block 1105 includes setting an initial value of the counter to a value corresponding to a time period to be measured, wherein the time period corresponds to a time period in which the communication device is to use the one or more second channel access parameters. In an embodiment, block 1105 includes setting an initial value of the counter to zero or another suitable initial value. In an embodiment, block 1105 includes recording an initial value of the counter.

At block 1110, it is determined whether the counter reached an end value corresponding to the time period having expired. In an embodiment, block 1110 is repeated until it is determined that the counter reached the end value. In response to determining that the counter reached the end value, the flow proceeds to block 1115. At block 1115, the communication device determines that the communication device is to use the one or more first channel access parameters.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a communication network, the method comprising:
   associated with a prior uplink multi-user (UL MU) communication in which a communication device participated, initiating a time period;
   attempting by the communication device, to access a communication medium, wherein the attempting to access the communication medium includes, responsive that the time period has not expired, using one or more second radio access parameters to attempt to access the communication medium, and wherein the attempting to access the communication medium includes, responsive that the time period has expired, using one or more first radio access parameters to attempt to access the communication medium;
   and in response to accessing the communication medium, transmitting by the communication device, a single user (SU) transmission via the communication medium;
   wherein the one or more first radio access parameters includes a first contention window minimum size; and the one or more second radio access parameters includes a second contention window minimum size that is different than the first contention window minimum size.

2. The method of claim 1 comprising:
   receiving, at the communication device, a time value parameter from an access point device that manages the communication network, wherein the time value parameter indicates the time period.

3. The method of claim 1 comprising:
   determining whether the transmission by the communication device as part of the prior UL MU communication was successful, wherein the initiating a time period is performed responsive to determining that the transmission was successful.

4. The method of claim 1 wherein the second contention window minimum size is larger than the first contention window minimum size.

5. A method for communicating in a communication network, the method comprising:
   associated with a prior uplink multi-user (UL MU) communication in which a communication device participated, initiating a time period;
   attempting by the communication device, to access a communication medium, wherein the attempting to access the communication medium includes, access parameters to attempt to access the communication medium, and wherein the attempting to access the communication medium includes responsive that the time period has expired, using one or more first radio access parameters to attempt to access the communication medium;
   in response to accessing the communication medium, transmitting by the communication device, a single user (SU) transmission via the communication medium;
   determining whether the transmission by the communication device as part of the nor UL MU communication was successful, wherein the initiating a time period is performed responsive to determining that the transmission was successful;
   wherein determining whether the transmission by the communication device as part of the prior UL MU communication was successful includes determining, at the communication device, whether the communication device received an acknowledgment from another communication device in response to the transmission by the communication device as part of the prior UL MU communication.

6. The method of claim 5 wherein the another communication device is characterized as an access point device that manages the communication network.

7. The method of claim 5 wherein the one or more first radio access parameters includes a first contention window minimum size and the one or more second radio access parameters includes a second contention window minimum size that is different than the first contention window minimum size.

8. The method of claim 5 wherein using the one or more first radio access parameters is associated with a greater probability of obtaining access to the communication medium as compared to using the one or more second radio access parameters to access the communication medium.

9. A method for communicating in a communication network, the method comprising:
   associated with a prior uplink multi-user (UL MU) communication in which a communication device participated, initiating a time period;
   attempting by the communication device, to access a communication medium, wherein the attempting to access the communication medium includes, responsive that the time period has not expired, using one or more second radio access parameters to attempt to access the communication medium, and wherein the attempting to access the communication medium includes responsive that the time period has expired, using one or more first radio access parameters to attempt to access the communication medium;
   in response to accessing the communication medium, transmitting by the communication device, a single user (SU) transmission via the communication medium;
   wherein using the one or more first radio access parameters is associated with a greater probability of obtaining access to the communication medium as compared to using the one or more second radio access parameters to access the communication medium.

10. The method of claim 9 wherein the one or more first radio access parameters includes a first contention window minimum size; and the one or more second radio access parameters includes a second contention window minimum size that is different than the first contention window minimum size.

11. A communication device, comprising:
    a network interface device, the network interface device having one or more integrated circuit devices, wherein the network interface device is configured to:

associated with a prior uplink multi-user (UL MU) communication in which the communication device participated, initiate a time period;

attempt to access a communication medium, wherein the attempt to access the communication medium includes, responsive that the time period has not expired, using one or more second radio access parameters to attempt to access the communication medium, and wherein the attempt to access the communication medium includes, responsive that the time period has expired, using one or more first radio access parameters to attempt to access the communication medium;

wherein the one or more first radio access parameters includes a first contention window minimum size and the one or more second radio access parameters includes a second contention window minimum size that is different than the first contention window minimum size.

12. The communication device of claim 11 wherein the network interface device is configured to in response to accessing the communication medium, transmit a single user (SU) transmission via the communication medium.

13. The communication device of claim 11 wherein the network interface device is configured to receive a time value parameter from an access point device that manages a communication network, wherein the time value parameter indicates the time period.

14. The communication device of claim 11 wherein the network interface device is configured to determine whether the transmission as part of the prior UL MU communication was successful, wherein the time period is initiated responsive to determining that the transmission was successful.

15. The communication device of claim 11 wherein the second contention window minimum size is larger than the first contention window minimum size.

16. A communication device, comprising:
a network interface device, the network interface device having one or more integrated circuit devices, wherein the network interface device is configured to:
associated with a prior uplink multi-user (UL MU) communication in which the communication device participated, initiate a time period;
attempt to access a communication medium, wherein the attempt to access the communication medium includes, responsive that the time period has not expired, using one or more second radio access parameters to attempt to access the communication medium, and wherein the attempt to access the communication medium includes, responsive that the time period has expired, using one or more first radio access parameters to attempt to access the communication medium;
wherein the network interface device is configured to determine whether the transmission as part of the prior UL MU communication was successful, wherein the time period is initiated responsive to determining that the transmission was successful;
wherein the network interface device being configured to determine whether the transmission by the communication device as part of the prior UL MU communication was successful includes the network interface device being configured to determine whether the communication device received an acknowledgment from another communication device in response to the transmission of the prior UL MU communication.

17. The communication device of claim 16 wherein the another communication device is characterized as an access point device that manages the communication network.

18. The communication device of claim 16 wherein the one or more first radio access parameters includes a first contention window minimum size and the one or more second radio access parameters includes a second contention window minimum size that is different than the first contention window minimum size.

19. The communication device of claim 16 wherein using the one or more first radio access parameters is associated with a greater probability of obtaining access to the communication medium as compared to using the one or more second radio access parameters to access the communication medium.

20. A communication device, comprising:
a network interface device, the network interface device having one or more integrated circuit devices, wherein the network interface device is configured to:
associated with a prior uplink multi-user (UL MU) communication in which the communication device participated, initiate a time period;
attempt to access a communication medium, wherein the attempt to access the communication medium includes, responsive that the time period has not expired, using one or more second radio access parameters to attempt to access the communication medium, and wherein the attempt to access the communication medium includes, responsive that the time period has expired, using one or more first radio access parameters to attempt to access the communication medium;
wherein using the one or more first radio access parameters is associated with a greater probability of obtaining access to the communication medium as compared to using the one or more second radio access parameters to access the communication medium.

21. The communication device of claim 20 wherein the one or more first radio access parameters includes a first contention window minimum size and the one or more second radio access parameters includes a second contention window minimum size that is different than the first contention window minimum size.

* * * * *